US 7,485,385 B2

(12) United States Patent
Seccombe, Jr. et al.

(10) Patent No.: US 7,485,385 B2
(45) Date of Patent: Feb. 3, 2009

(54) PROCESS FOR SOLID OXIDE FUEL CELL MANUFACTURE (75) Inventors: Donald A. Seccombe, Jr., Gloucester, MA (US); Gary Orbeck, Windham, NH (US); Srikanth Gopalan, Westborough, MA (US); Uday Pal, Dover, MA (US)

(73) Assignees: BTU International, Inc., North Billerica, MA (US); The Trustees of Boston University, Boston, MA (US)

( * ) Notice: Subject to any disclaimer, the term of this patent is extended or adjusted under 35 U.S.C. 154(b) by 144 days.

(21) Appl. No.: 10/939,116

(22) Filed: Sep. 10, 2004

(65) Prior Publication Data
US 2005/0089739 A1    Apr. 28, 2005

Related U.S. Application Data (60) Provisional application No. 60/501,742, filed on Sep. 10, 2003.

(51) Int. Cl.
*H01M 8/10* (2006.01)

(52) U.S. Cl. .............................. 429/30; 429/40; 429/45

(58) Field of Classification Search .................. 429/30, 429/45, 40
See application file for complete search history.

(56) References Cited

U.S. PATENT DOCUMENTS

| 4,000,006 | A | * | 12/1976 | Trocciola et al. ............. 427/115 |
| 4,421,787 | A | | 12/1983 | Ikezawa et al. ............ 427/126.2 |
| 4,799,936 | A | * | 1/1989 | Riley ............................. 29/623.1 |
| 4,997,726 | A | | 3/1991 | Akiyama et al. ............... 429/32 |
| 5,069,987 | A | | 12/1991 | Gordon ........................ 429/31 |
| 5,290,642 | A | | 3/1994 | Minh et al. |

(Continued)

FOREIGN PATENT DOCUMENTS

EP    1 624 521    2/2006

*Primary Examiner*—Patrick Ryan
*Assistant Examiner*—Ben Lewis
(74) *Attorney, Agent, or Firm*—Weingarten, Schurgin, Gagnebin & Lebovici LLP (57) ABSTRACT The present invention provides a method for conveniently manufacturing a solid oxide fuel cell (SOFC) at a cost that is less than five-hundred dollars per kilowatt of electricity. The method comprises forming an electrode layer and depositing an electrolyte material on the surface of the electrode. The formed structure is an electrode-electrolyte bi-layer. A second electrode is deposited onto this bi-layer to form a multi-layer fuel cell structure comprising an electrolyte positioned between two electrodes. This multilayer structure is then heated and fired in a single thermal cycle to remove any binder materials and sinter, respectively, the fuel cell. This thermal cycle can be performed in a furnace having one or more chambers. The chamber(s) preferably contains a variable or multiple frequency microwave source for heating the cell and removing binder materials in the electrolyte and electrode structures. The chamber(s) also preferably include a convection and/or radiation source for sintering the fuel cell. In addition, the method of the invention harmonizes and minimizes the deviation among the thermophysical properties of the electrolyte and electrode structures. This harmonization reduces and minimizes the temperature gradient within the cell such that the structure can be uniformly heated and fired during the thermal cycle. The multilayer structure is also unlikely to distort and fracture by minimizing the temperature gradient in the cell. An SOFC can also be manufactured by the present method in an order of magnitude less time than standard processes.

33 Claims, 6 Drawing Sheets

U.S. PATENT DOCUMENTS

| | | | |
|---|---|---|---|
| 5,292,599 A | 3/1994 | Soma et al. | 429/30 |
| 5,486,428 A | 1/1996 | Gardner et al. | 429/19 |
| 5,529,856 A * | 6/1996 | Petri et al. | 429/41 |
| 5,554,454 A | 9/1996 | Gardner et al. | 429/19 |
| 5,595,833 A | 1/1997 | Gardner et al. | 429/19 |
| 5,725,965 A * | 3/1998 | Wachsman et al. | 429/33 |
| 5,753,385 A | 5/1998 | Jankowski et al. | 429/44 |
| 5,827,620 A | 10/1998 | Kendall | 429/31 |
| 5,922,486 A | 7/1999 | Chiao | 429/32 |
| 5,993,986 A | 11/1999 | Wallin et al. | 429/32 |
| 6,099,985 A | 8/2000 | Elangovan et al. | 429/44 |
| 6,117,302 A | 9/2000 | Roha | 205/343 |
| 6,228,520 B1 | 5/2001 | Chiao | 429/32 |
| 6,316,138 B1 | 11/2001 | Satake et al. | 429/36 |
| 6,428,920 B1 | 8/2002 | Badding et al. | 429/30 |
| 6,436,565 B1 | 8/2002 | Song et al. | 429/31 |
| 6,485,852 B1 | 11/2002 | Miller et al. | 429/17 |
| 6,551,734 B1 | 4/2003 | Simpkins et al. | 429/26 |
| 6,593,020 B1 | 7/2003 | Yoo et al. | 429/33 |
| 6,649,296 B1 | 11/2003 | Minh | 429/34 |
| 6,653,009 B2 * | 11/2003 | Wang et al. | 429/30 |
| 6,677,070 B2 | 1/2004 | Kearl | 429/33 |
| 6,682,842 B1 * | 1/2004 | Visco et al. | 429/33 |
| 6,783,880 B2 | 8/2004 | Christiansen | 429/33 |
| 6,790,474 B1 | 9/2004 | Hishinuma et al. | 427/115 |
| 6,803,141 B2 | 10/2004 | Pham et al. | 429/33 |
| 6,822,193 B2 | 11/2004 | Olsen et al. | 219/121.72 |
| 6,835,485 B2 | 12/2004 | Ukai et al. | 429/33 |
| 6,846,511 B2 | 1/2005 | Visco et al. | 427/115 |
| 6,855,451 B2 | 2/2005 | Ghosh et al. | 429/39 |
| 6,864,009 B2 | 3/2005 | Yoo et al. | 429/34 |
| 6,896,989 B2 | 5/2005 | Hara et al. | 429/30 |
| 6,949,307 B2 | 9/2005 | Cable et al. | 429/38 |
| 2002/0028367 A1 * | 3/2002 | Sammes et al. | 429/31 |
| 2002/0142210 A1 | 10/2002 | Kaiser et al. | 429/36 |
| 2002/0155227 A1 | 10/2002 | Damani et al. | 427/453 |
| 2003/0082434 A1 | 5/2003 | Wang et al. | 4/86 |
| 2003/0232230 A1 * | 12/2003 | Carter et al. | 429/32 |
| 2004/0121217 A1 * | 6/2004 | Herman et al. | 429/38 |
| 2006/0057295 A1 | 3/2006 | Visco et al. | 427/372.2 |

* cited by examiner

Green bi-layer of a screen printed yttria-stabilized zirconia (YSZ) electrolyte over a tape cast nickel-YSZ oxide composite anode layer(s).

*FIG. 5*

SEM micrograph of a cross-section of a fired bi-layer structure of a yttria-stabilized zirconia (YSZ) electrolyte over a nickel-YSZ oxide composite anode.

PROCESS FOR SOLID OXIDE FUEL CELL MANUFACTURE

CROSS REFERENCE TO RELATED APPLICATIONS

This application claims the priority of U.S. Provisional Application No. 60/501,742 filed Sep. 10, 2003 and entitled, SINGLE STEP CO-FIRING PROCESS FOR FUEL CELL MANUFACTURE, which is hereby incorporated by reference herein.

BACKGROUND OF THE INVENTION

A fuel cell is a device or system that generates electricity by an electrochemical reaction in which oxygen and hydrogen combine to form water. An electrolyte in the cell carries charged particles across a cathode to an anode. Catalysts are often employed to accelerate and improve the efficiency of the electrochemical reaction. Fuel cell devices are a viable source of alternative energy. These devices are generally more efficient and produce less pollution than conventional sources of power. The electricity produced by fuel cells can be used to power, for example, aeronautical systems, computer devices, automotive systems and cellular devices.

Typically, fuel cells are classified by the type of electrolyte used. Fuel cell devices also feature different materials depending on an application or specific power requirements. The variety of fuel cells includes, for example, phosphoric acid, proton exchange membrane, molten carbonate, alkaline and solid oxide devices. The solid oxide fuel cell (SOFC) provides an environmentally clean and versatile power source that can efficiently convert fossil fuels into electricity and heat.

An SOFC comprises a dense electrolyte that is positioned between porous electrodes, namely, the cathode and anode. The dense electrolyte can be a solid oxygen-ion conductor such as yttria-stabilized zirconia (YSZ). Moreover, the cathode and anode can be ceramic composites such as strontium doped lanthanum manganite-YSZ and nickel-YSZ oxide, respectively. SOFC devices can also be assembled into a planar stack in which several cells are arranged with interconnects separating each cell.

An obstacle to commercializing SOFC devices is the substantial cost associated with their manufacture. This cost is an order of magnitude higher than fabricating a comparable gas turbine. One reason for this disparity is that SOFC devices are manufactured by batch processes. Batch processes are used to slowly heat and fire the fuel cell structure to prevent the electrolyte and electrodes from distorting. A standard batch process can uniformly heat and fire an SOFC at a thermal rate of about 1° C. per minute. This rate can require several hours to sinter the electrolyte and electrode structures. The process can also require multiple thermal cycles to heat and cool the cell during fabrication. Thus, manufacturing a fuel cell by such processes is entirely inefficient and expensive. With the growing demand for fuel cells, there is a specific need for an efficient fabrication process that is inexpensive and does not require multiple thermal cycles.

SUMMARY OF THE INVENTION

The present invention provides a method for conveniently manufacturing a solid oxide fuel cell (SOFC) at a cost that is less than five-hundred dollars per kilowatt of electricity. The method comprises forming an electrode layer and depositing an electrolyte material on the surface of the electrode. The formed structure is an electrode-electrolyte bi-layer. A second electrode is deposited onto this bi-layer to form a multilayer fuel cell structure comprising an electrolyte positioned between two electrodes. This multilayer structure is then heated and fired in a single thermal cycle to remove any binder materials and sinter, respectively, the fuel cell. This thermal cycle can be performed in a furnace having one or more chambers. The chamber(s) preferably contains a variable or multiple frequency microwave source for heating the cell and removing binder materials in the electrolyte and electrode structures. The chamber(s) also preferably includes a convection and/or radiation source for sintering the fuel cell.

Additionally, the method of the invention harmonizes and minimizes the deviation among the thermophysical properties of the electrolyte and electrode structures. This harmonization reduces and minimizes the temperature gradient within the cell such that the structure can be uniformly heated and fired during the thermal cycle. The multilayer structure is also unlikely to distort and fracture by minimizing the temperature gradient in the cell. A multilayer fuel cell can also be manufactured by the present method in an order of magnitude less time than standard processes.

The method of the invention can be employed to fabricate an SOFC stack in which several cells are arranged with interconnects separating each cell. The invention also provides a multilayer SOFC structure fabricated according to the disclosed method. These fuel cell devices could be used to power, for example, aeronautical systems, computer devices, automotive systems and cellular devices.

An SOFC manufactured by the disclosed method generally operates in a temperature range from about 700 to 1100° C. The SOFC comprises a dense electrolyte that is positioned between porous electrodes, namely, the cathode and anode. The dense electrolyte can be a solid oxygen-ion conductor such as yttria-stabilized zirconia (YSZ). Moreover, the cathode and anode can be ceramic composites such as strontium doped lanthanum manganite-YSZ and nickel-YSZ oxide, respectively.

Generally, the method of the invention comprises forming an electrode by controllably distributing phases and particles sizes. The electrode can be an individual or multiple layer porous structure that is "green" or unfired. The electrode is also dried to have a thickness in the range of about 0.5 to 2.0 mm. A dense electrolyte is then deposited onto the electrode surface as an individual or multiple solid layer having a dried thickness in the range of about 5 to 1000 μm.

A second electrode is deposited on this bi-layer structure. The second electrode can also be an individual or multiple layer porous structure having a dried thickness in the range of about 50 to 150 μm. Each of the above electrolyte and electrode layers are formed according to the invention by suitable deposition techniques such as, for example, screen printing, vacuum infiltration, electrophoretic deposition, ink jet printing, cold pressing, tape casting or spraying. The formed multilayer structure can then be heated and fired in one thermal cycle. This cycle can be performed at a thermal rate of about 10° C. per minute.

DESCRIPTION OF THE DRAWINGS

Other features and advantages of the present invention will be apparent from the following detailed description of the invention, taken in conjunction with the accompanying drawings of which.

DETAILED DESCRIPTION OF THE INVENTION

The present invention provides a method for fabricating a solid oxide fuel cell (SOFC) in a single thermal cycle. This cycle can be performed as a batch or continuous process. An SOFC can be conveniently manufactured according to the invention at a cost that is less than five-hundred dollars per kilowatt of electricity. The manufactured SOFC also operates in a temperature range from about 700 to 1100° C. Similarly, the method of the invention can fabricate an SOFC stack in which several cells are arranged with interconnects separating each cell. Fuel cell devices manufactured by the disclosed method could be used to power, for example, aeronautical systems, computer devices, automotive systems and cellular devices.

Figure 1:
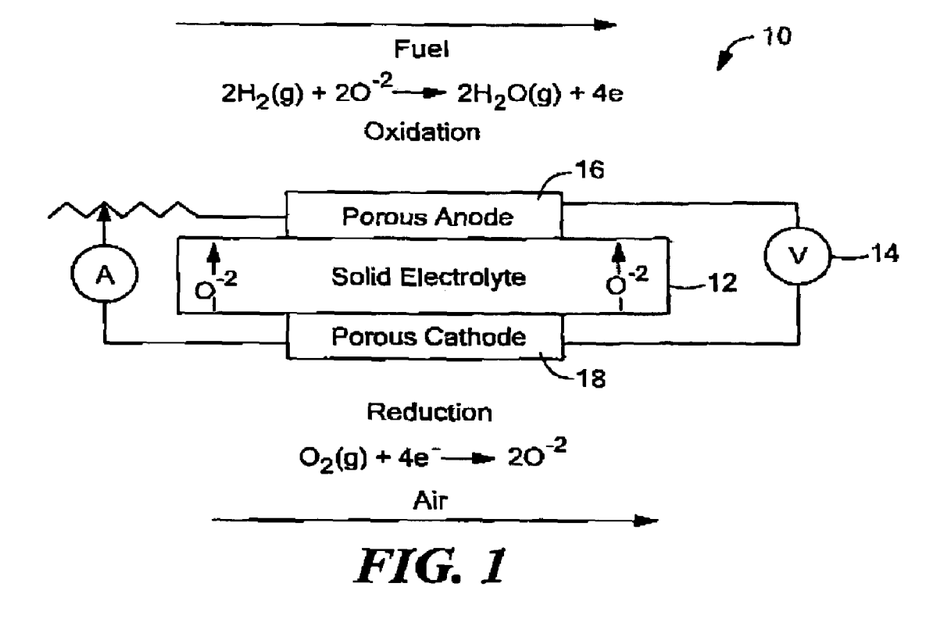
FIG. 1 is a partial representation of a solid oxide fuel cell (SOFC) comprising a dense electrolyte that is positioned between porous electrode structures.

Fuel cells offer an environmentally clean and versatile power source for efficiently converting fossil fuels into electricity and heat. FIG. 1 is a representation of an SOFC 10 comprising a dense electrolyte 12 that is positioned between porous electrodes, namely, the cathode 18 and anode 16. The dense electrolyte can be a solid oxygen-ion conductor such as yttria-stabilized zirconia (YSZ). In addition, the cathode and anode can be ceramic composites such as strontium doped lanthanum manganite-YSZ and nickel-YSZ oxide, respectively. The fuel cell generates electricity by an electrochemical reaction in which oxygen and hydrogen combine to form water. Specifically, the electrodes reduce oxygen and oxidize hydrogen to yield a voltage 14. The electrodes can also comprises a catalyst such as nickel oxide. This catalyst can accelerate and improve the efficiency of the electrochemical reaction.

Figure 2:
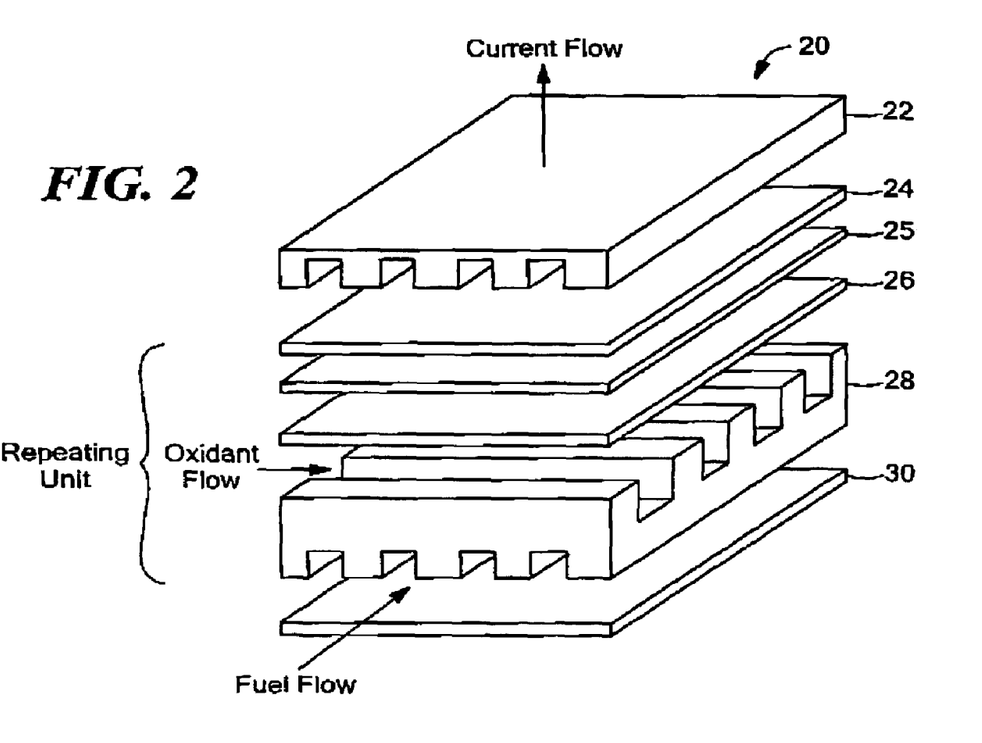
FIG. 2 is a perspective representation of an SOFC stack in which several cells are arranged with interconnects separating each cell.

FIG. 2 is an SOFC stack 20 in which several cells are arranged with interconnects separating each cell. A single fuel cell in the planar stack comprises an electrolyte 25 that is positioned between a cathode 26 and anode 24. The interconnect could be a plate 22 or separator 28 that guides fuel and oxidant flows through the stack. These interconnects are commonly composites such as, for example, lanthanum chromite.

The method of the invention comprises forming an electrode by controllably distributing phases and particles sizes to provide a thermophysically consistent layer having, for example, a uniform microstructure, elasticity and/or a coefficient of thermal expansion. Consistency among these properties prevents the electrode from distorting and fracturing in a thermal cycle. The method also harmonizes and minimizes the deviations among the thermophysical properties of the electrolyte and electrode layers. This harmonization reduces and minimizes the temperature gradient of the cell during the thermal cycle such that the structure can be uniformly heated and fired in an efficient manner.

The electrode is preferably a porous anode such as shown in FIGS. 1 and 2. The porous anode can also be an individual or multiple layer composite such as, for example, nickel-YSZ oxide, nickel-gadolinium oxide doped cerium oxide, nickel-samarium oxide doped cerium oxide, cobalt-YSZ oxide or cobalt-gadolinium oxide doped cerium oxide.

The composite electrode is deposited as a green layer(s) having a preferable thickness in the range of about 0.5 to 2.0 mm. This electrode thickness acts as a mechanical support for the fuel cell. The thickness can depend on the tape cast layers preferably used to form the electrode. These layers can also be cast with varying porosities to control gas transport phenomena.

In general, tape cast layers are formed by depositing a powder slurry onto a substrate having a release material. The slurry can comprise binder, dispersant, solvent, plasticizer and composite solids. The binder, for example, can be polyvinyl alcohol or polyvinyl butyral. A common solvent could include ethanol, toluene, methanol or isopropanol. The dispersant or dispersing "agent" can include fish oil. These materials are milled and sieved to remove soft agglomerates. A hopper aids the flow of powder slurry onto the substrate and a "doctor blade" uniformly distributes the slurry to cast the layer. This layer is then peeled from the substrate and trimmed for the electrode.

Figure 3:
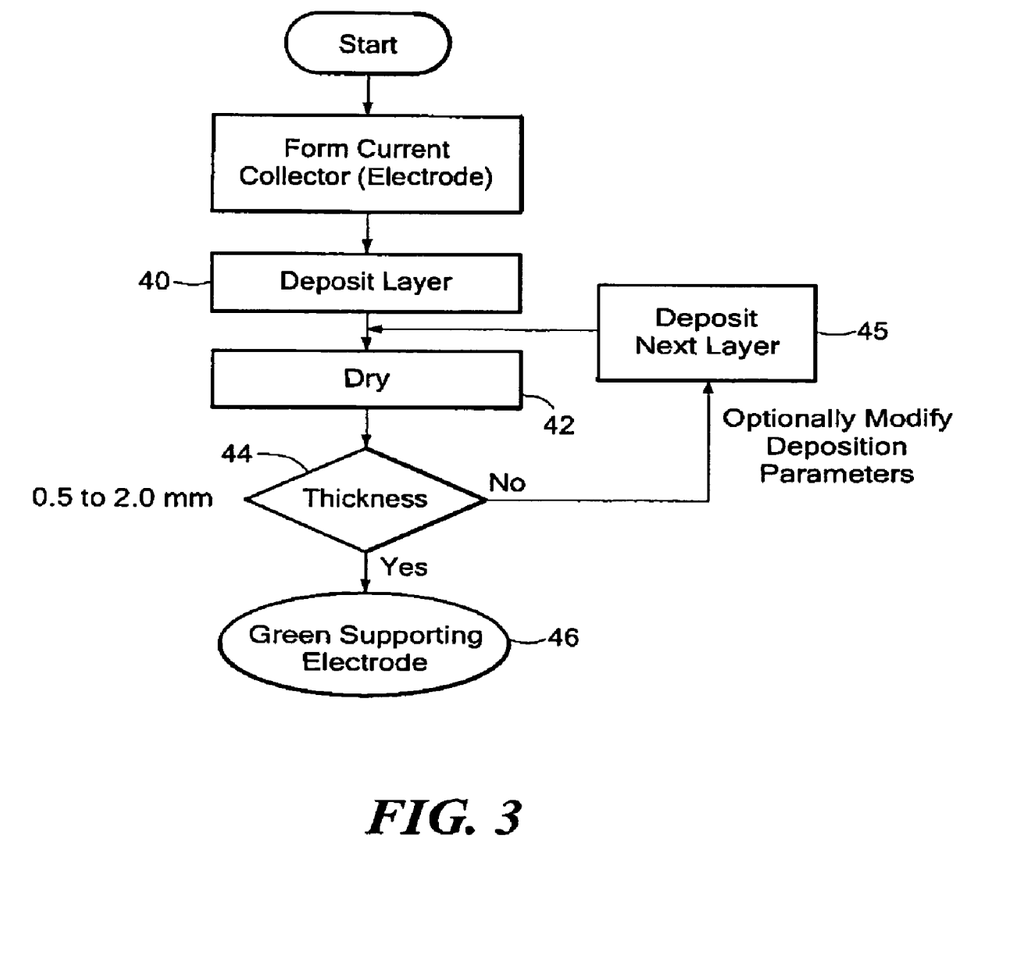
FIG. 3 is a flowchart in which a porous electrode layer(s) is formed by the method of the invention.

The flowchart of FIG. 3 shows a tape cast layer provided in step 40. The layer is dried by a suitable technique during step 42 in a temperature range from about 100 to 400° C. This temperature range preferably evaporates materials in the cast layer such as dispersant, solvent and plasticizer to form the porous electrode. The temperature range can also vary depending on the volatility of these materials. The thickness of the electrode can then be measured in step 44 by a convenient technique such as, for example, an optical or scanning electron microscope.

Additional tape cast layers can be deposited onto the electrode in step 45 and dried individually until a thickness in the preferred range of about 0.5 to 2.0 mm is measured. As described above, these additional layers can be cast with varying porosities to control gas transport phenomena and improve the efficiency of the electrode. It is preferable for the electrodes to be less porous near the electrolyte and increase in porosity through to their exterior surfaces. The formed individual or multiple layer electrode structure of step 46 is then prepared to be processed further according to the invention.

Figure 4:
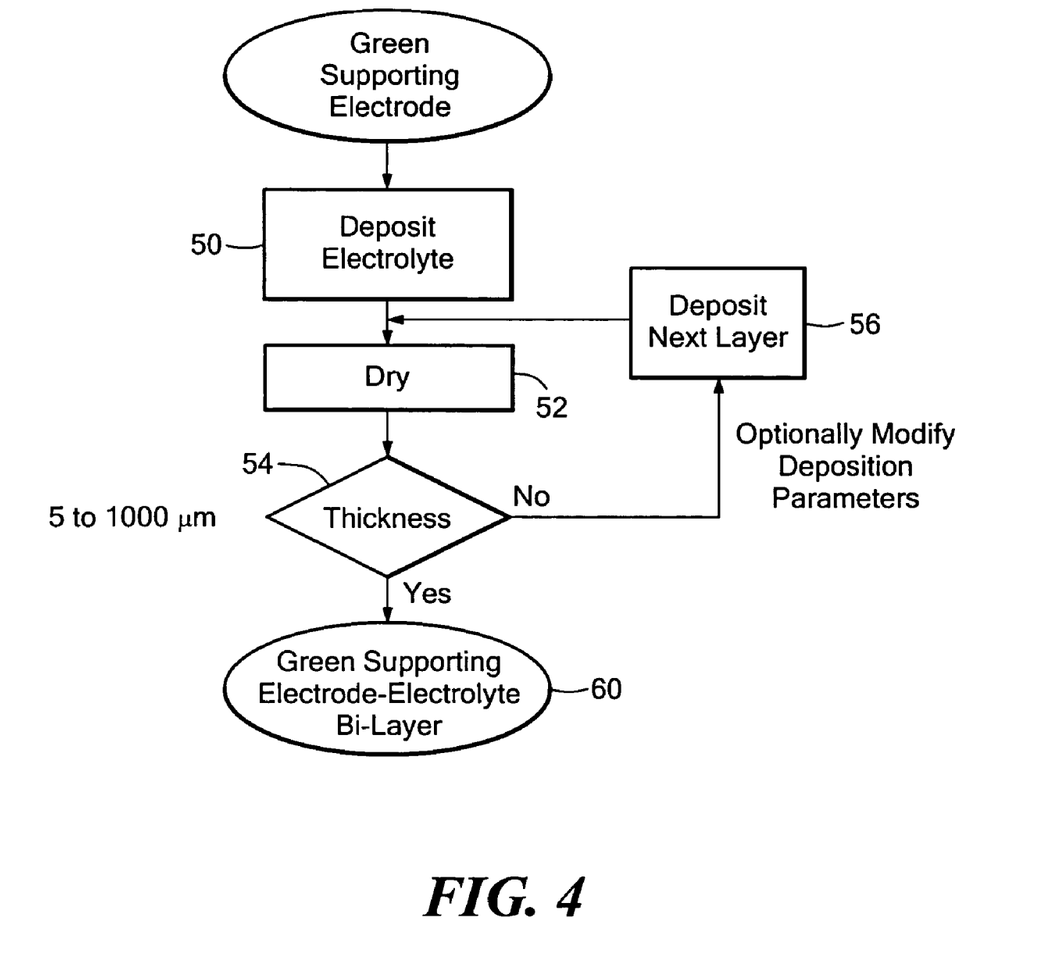
FIG. 4 is a flowchart in which a dense electrolyte layer(s) is formed on a surface of the electrode in FIG. 3 by the method of the invention to comprise an electrode-electrolyte bi-layer structure.

FIG. 4 shows a flowchart in which a dense electrolyte is formed on an electrode layer(s) prepared by the method of the invention. This electrolyte can be an individual or multiple layer solid conductor such as shown in FIGS. 1 and 2. Examples of such solid conductor materials include YSZ, ceria-gadolinium oxide, strontium, magnesium lanthanum gallate or a rare earth metal doped cerium oxide. An YSZ conductor operates efficiently in a temperature range from about 700 to 1100° C., although this range could vary for different electrolyte solids.

The electrolyte layer(s) can be screen printed in step 50 onto the electrode surface as a powder slurry. Screen printing controls the distribution of phases and particle sizes to provide a consistent thermophysical structure. The deposited electrolyte preferably has a thickness in a range of about 5 to 1000 µm. This thickness depends on different printing characteristics such as, for example, the composite solids content or particle distribution in the layer(s).

The powder slurry for the electrolyte can comprise binder, dispersant, solvent, plasticizer and composite solids. As described above, these materials are milled and sieved to remove soft agglomerates before printing. The screen printed slurry layer is dried during step 52 in a temperature range from about 100 to 400° C. This temperature range preferably evaporates materials in the printed layer to form the dense electrolyte. The thickness of the electrolyte can then be measured in step 54 by a suitable technique including those previously described.

The electrolyte can be formed by depositing additional screen printed layers in step 56. These layers are each dried until a thickness in the preferred range of about 5 to 1000 µm is measured. Printing additional layers can be varied to control gas transport phenomena and improve the efficiency of the electrolyte. The formed bi-layer structure of step 60 is then prepared to be processed further according to the invention.

Figure 5:
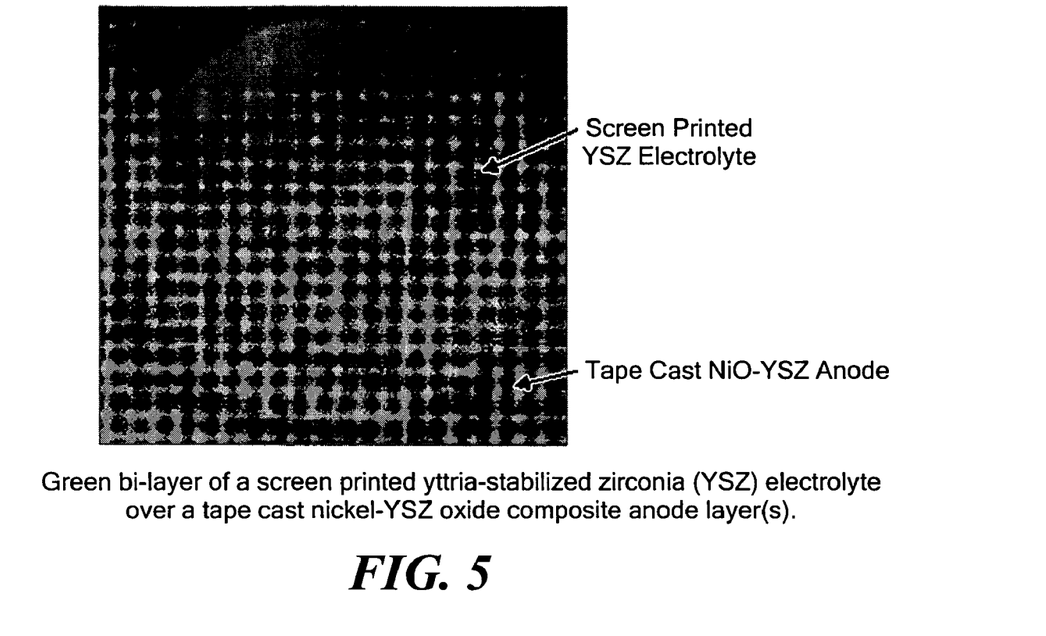
FIG. 5 is an image of an electrode-electrolyte bi-layer formed by the method of the invention as shown in the flowchart of FIG. 4.
Figure 6:
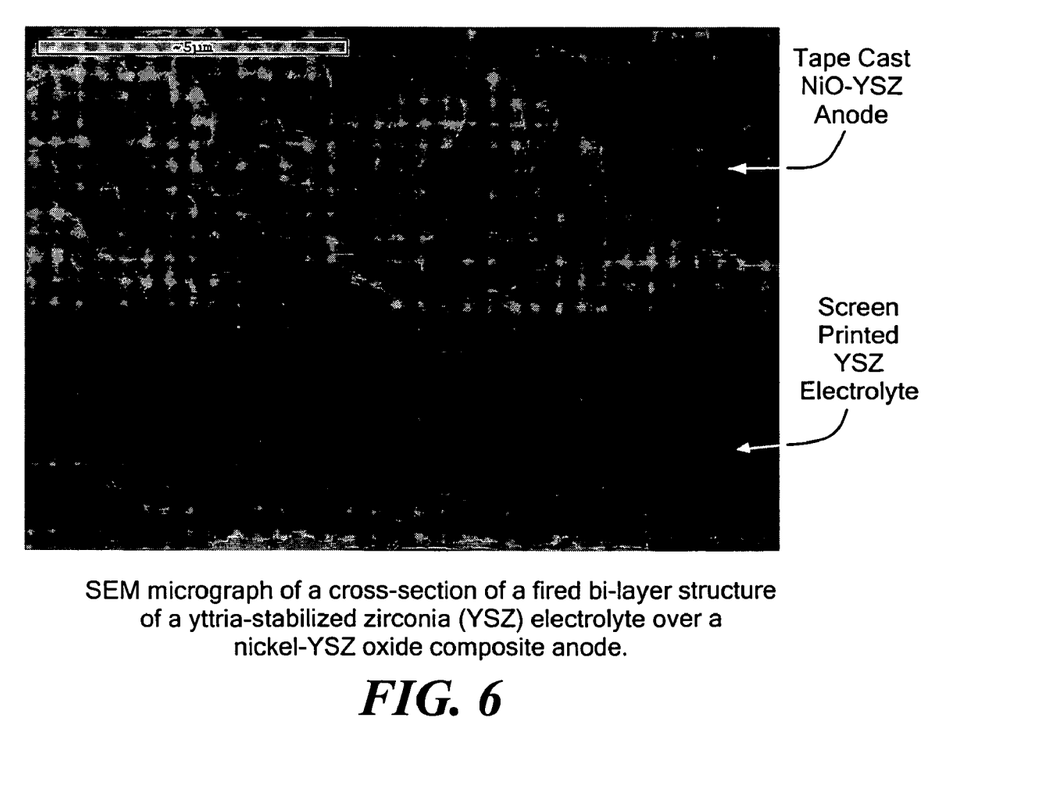
FIG. 6 is a scanning electron microscope image of an electrode-electrolyte bi-layer formed by the method of the invention as shown in the flowchart of FIG. 4.

An example of this electrode-electrolyte bi-layer structure is represented in FIGS. 5 and 6. FIG. 5 shows the electrode as a tape cast porous nickel-YSZ oxide anode layer(s). The electrolyte layer(s) is screen printed onto the surface of the anode. This electrolyte is a YSZ solid conductor. FIG. 6 is a scanning electron microscope image of this bi-layer structure.

Figure 7:
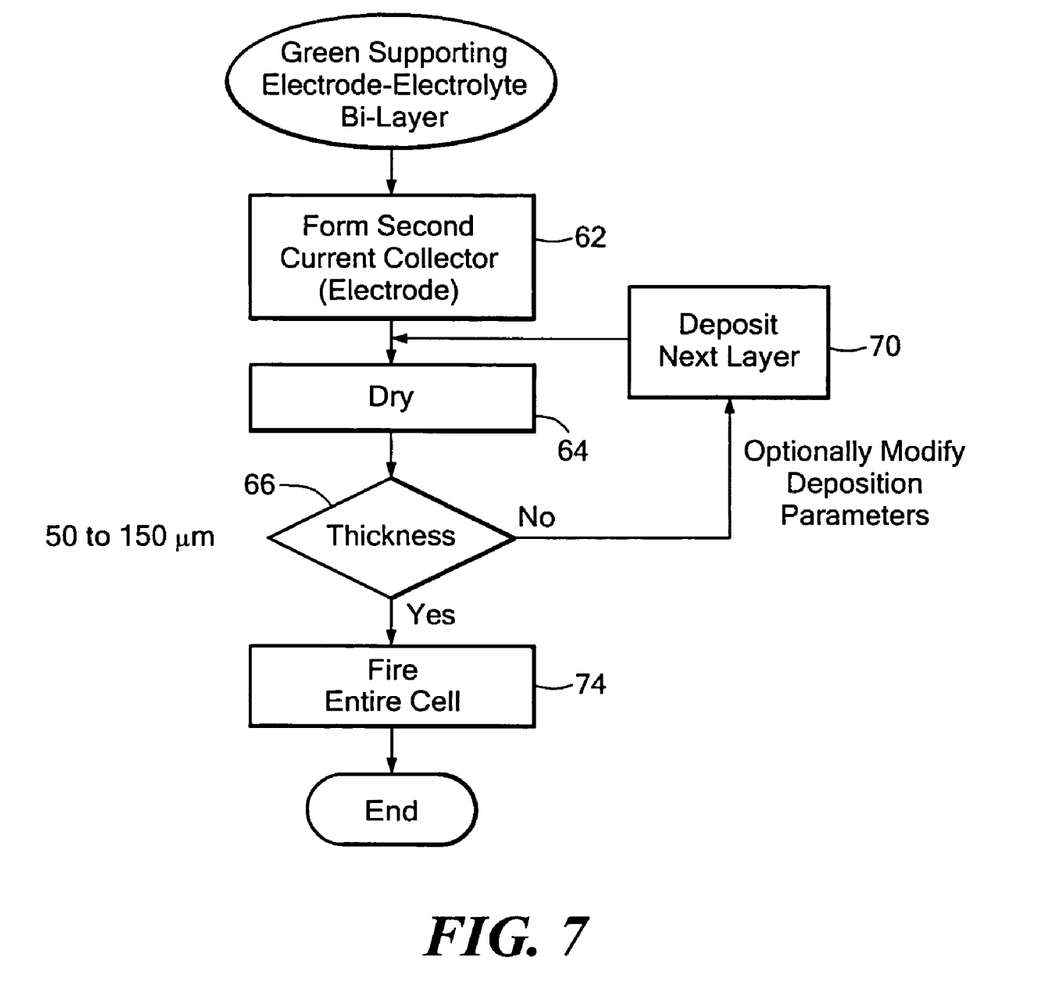
FIG. 7 is a flowchart in which a porous electrode layer(s) is deposited on a surface of the electrolyte in FIG. 4, the formed multilayer structure is heated and fired in a single thermal cycle by the method according to the invention.

A second electrode is then deposited onto the electrolyte of the bi-layer structure. The flowchart of FIG. 7 shows the electrode formed on the surface of the electrolyte layer(s) during step 62. The electrode is formed by controllably distributing phases and particle sizes. The formed electrode is preferably a porous cathode such as shown in FIGS. 1 and 2. The porous cathode can also be an individual or multiple layer composite such as, for example, as strontium doped lanthanum manganite-YSZ.

The composite electrode can be screen printed as a layer(s) having a preferable thickness in the range of about 50 to 150 µm. This thickness depends on the printed layers used to form the electrode. The electrode is deposited as a power slurry that can comprise binder, dispersant, solvent, plasticizer and composite solids. These materials are milled and sieved to remove soft agglomerates before printing. As shown, the deposited slurry layer is dried during step 64 in a temperature range from about 100 to 400° C. This temperature range preferably evaporates materials in the printed layer to form the porous electrode. The thickness of the electrode can then be measured in step 66 by a suitable technique including those previously described.

The electrode can be formed by printing additional layers onto the electrolyte in step 70 and drying each layer until a thickness in the preferred range of about 50 to 150 µm is measured. As described above, these additional layers can be deposited with varying porosities to control gas transport phenomena and affect the efficiency of the electrode. This individual or multiple layer electrode structure formed on the electrode-electrolyte bi-layer comprises the multilayer fuel cell structure.

The multilayer structure generally includes a dense electrolyte that is positioned between porous electrodes. Any moisture within the multilayer cell is preferably evaporated by uniformly heating the structure in a temperature range from about 125 to 150° C. The structure can also be heated to remove binder from each of the cell layers in a temperature range from about 275 to 375° C. This temperature range volatizes any plasticizer, dispersant or solvent remaining within each layer. Binder materials that are heated often leave a carbon residue, which can be removed by uniformly heating the structure in a temperature range from about 500 to 600° C. This uniform heating is continued until a temperature of about 800° C. in order to decrease the time required for the thermal cycle and improve the process efficiency of the method. The structure is then fired during step 74 in a temperature range from about 1000 to 1500° C. to sinter the multilayer structure. The amount of time used to heat and fire the structure across the above temperature ranges can vary depending, for example, on the materials of the cell or a particular process.

The fuel cell structure can be uniformly heated by a variable or multi-frequency microwave source. Such microwave sources are generally described in U.S. Pat. Nos. 5,321,222, 5,521,360 and 5,961,871. The frequency and power level of the microwave source can be adjusted to provide efficient coupling of microwave energy to the cell structure. The microwave frequency can also be modulated or swept across a frequency band to provide an intended microwave spectrum. Alternatively, microwave energy could be provided at multiple frequencies. Although a microwave heating source is preferably used to uniformly heat the multilayer structure, other suitable heating processes that minimize the temperature gradient within the cell layers could be used.

A multilayer fuel cell can be fired by convection and/or radiation heating such as used in a ceramic sintering process. These heating methods could also be carried out in an atmosphere of circulated gas. Temperatures for firing an SOFC can depend on the thermophysical properties of the electrolyte and electrode layers. Thus, different electrical heaters such as, for example, nickel-chromium, molybdenum ribbon, molybdenum-silicate or silicon-carbide can be used for certain cell structures.

The method of the invention heats and fires the multilayer fuel cell in a single thermal cycle. This thermal cycle can be performed in a furnace having one or more chambers. The chamber(s) preferably contains a variable or multiple frequency microwave source for heating the cell and removing binder materials in the electrolyte and electrode structures. The chamber(s) also preferably includes a convection and/or radiation source for sintering the fuel cell. Such furnaces are described in U.S. patent application Ser. No. 10/775,542 assigned to BTU International, Incorporated. A single thermal cycle can also be performed as a batch or continuous process.

Figure 8:
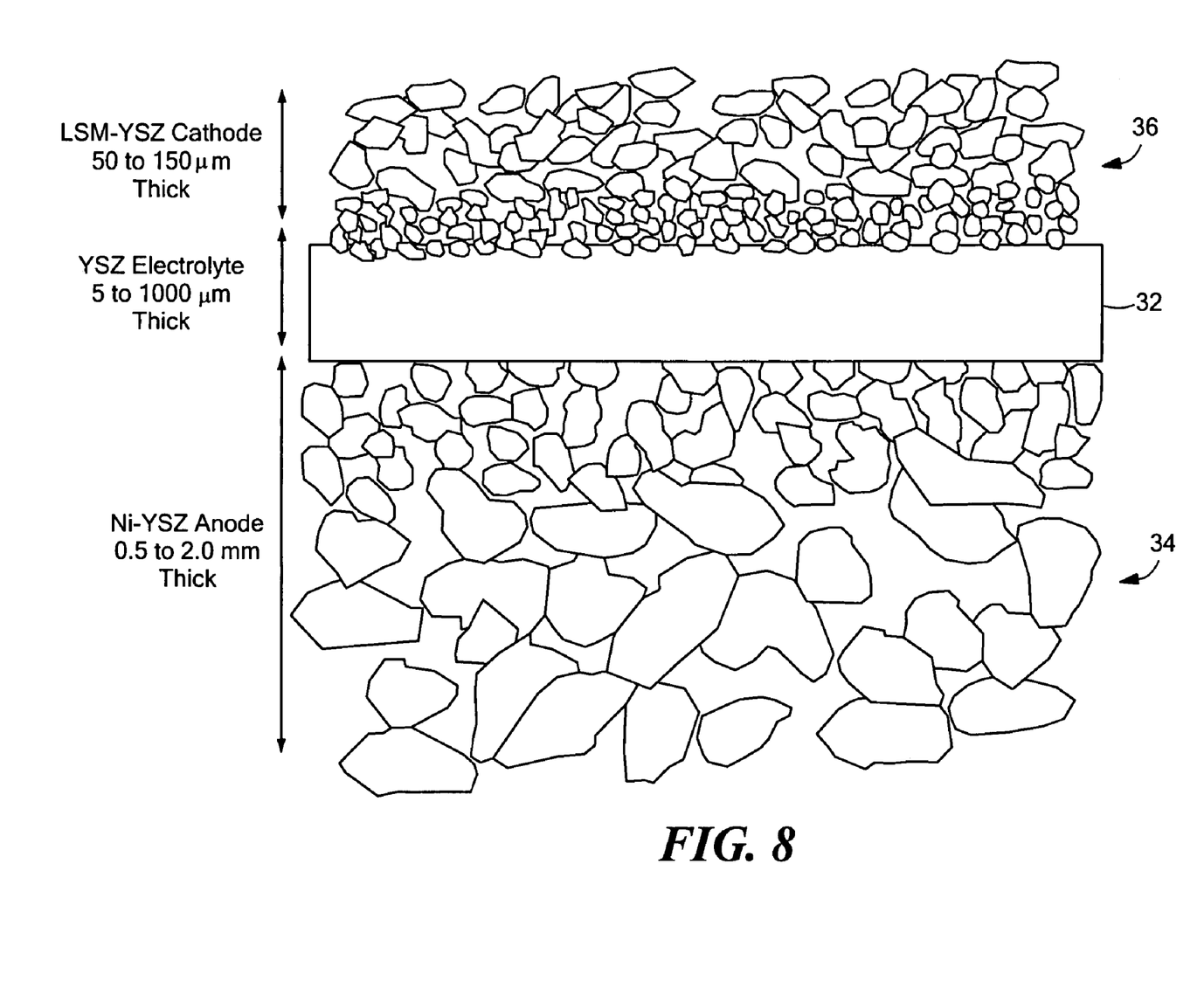
FIG. 8 is a partial representation of an SOFC manufactured according to the method of FIGS. 3, 4 and 7, the multilayer fuel cell comprising a solid yttria-stabilized zirconia (YSZ) electrolyte that is positioned between a strontium doped lanthanum manganite-YSZ cathode and a nickel-YSZ oxide anode.

The electrolyte of the multilayer cell structure is preferably an 8 mole percent YSZ solid conductor and the cathode and anode are strontium doped lanthanum manganite-YSZ and nickel-YSZ oxide ceramic composites, respectively. The electrolyte and electrode layers are also selected to have particle sizes in the range of nanometers or micrometers. FIG. 8 shows an SOFC formed and fired with these materials. The preferred thickness for the dense electrolyte and each porous electrode is also shown.

Process variables of the present invention can also be changed in order to, for example, decrease the time required for the thermal cycle and improve manufacturing efficiency. These variables can include temperature, time, atmosphere, particle size and/or particle distribution. Modifying these variables could also affect and improve interfacial contact and resistance between the layers as well as lower the internal stresses to prevent warping of the multilayer structure. The method of the invention can also be used to process an intermediate temperature SOFC device having, for example, oxygen pumps, sensors or other electrochemical devices.

While the present invention has been described in conjunction with a preferred embodiment, one of ordinary skill in the art, after reading the foregoing specification, will be able to effect various changes, substitutions of equivalents and other alterations to the compositions and articles set forth herein. It is therefore intended that the protection granted by Letters Patent hereon be limited only by the definitions contained in the appended claims and equivalents thereof.

What is claimed is:

1. A method for manufacturing a solid oxide fuel cell, the method comprising the following steps in the following order:
    forming a first electrode layer, which before firing has a thickness in a range of about 0.5 to 2.0 mm, the first electrode layer having a surface, and drying the first electrode layer;
    forming an electrolyte layer by screen printing a powder slurry on the surface of the first electrode layer, and drying the electrolyte layer;
    forming a second electrode layer on a surface of the electrolyte layer, and drying the second electrode layer, wherein the layers comprise a multilayer electrochemical structure;
    thermally processing the multilayer structure in a single thermal cycle that includes:
    heating the multilayer structure in a first portion of the single thermal cycle to a temperature and time sufficient to substantially remove moisture;
    heating the multilayer structure in a second portion of the single thermal cycle to a temperature and time sufficient to substantially remove binder;
    heating the multilayer structure in a third portion of the single thermal cycle to a temperature and time sufficient to substantially remove carbon residue; and
    firing the multilayer structure in a fourth portion of the single thermal cycle at a temperature and time sufficient to substantially sinter each layer and to form a solid electrolyte layer.

2. The method of claim 1, the method further comprising:
    depositing a slurry to form each layer, the slurry comprising binder, dispersant, solvent, plasticizer and composite solids; and
    drying the deposited slurry.

3. The method of claim 1, wherein energy for heating to remove the binder and other materials is provided by a variable or multiple frequency microwave source.

4. The method of claim 1, wherein firing is performed by convection heating, radiation heating or combinations thereof.

5. The method of claim 1, wherein sintering occurs at temperatures higher than about 1000° C.

6. The method of claim 1, wherein the heating step is provided by microwave energy.

7. The method of claim 1, wherein first electrode layer is operable to be an anode.

8. The method of claim 7, wherein the first electrode layer after firing is porous.

9. The method of claim 7, wherein the first electrode layer comprises a ceramic composite, the ceramic composite selected from a group consisting of nickel and yttria-stabilized zirconium oxide, nickel and gadolinium oxide doped cerium oxide, nickel and samarium oxide doped cerium oxide, cobalt and yttria-stabilized zirconium oxide, cobalt and gadolinium oxide doped cerium oxide and combinations thereof.

10. The method of claim 1, wherein the second electrode layer is operable to be a cathode.

11. The method of claim 10, wherein the second electrode layer after firing is porous.

12. The method of claim 11, wherein the second electrode layer before firing has a thickness in a range of about 50 to 150 μm.

13. The method of claim 10, wherein the second electrode layer comprises a strontium doped lanthanum manganite-yttria-stabilized zirconium oxide ceramic composite.

14. The method of claim 1, wherein the fired electrolyte layer is a dense solid.

15. The method of claim 14, wherein the electrolyte layer has a thickness before firing in a range of about 5 to 1000 μm.

16. The method of claim 14, wherein the electrolyte layer comprises a conductor, the conductor selected from a group consisting of yttria-stabilized zirconium oxide, ceria-gadolinium oxide, strontium, magnesium lanthanum gallate, rare earth metal doped cerium oxide and combinations thereof.

17. The method of claim 1, the method further comprising:
    measuring the defined thickness of the dried first layer to compare with a required thickness;
    providing an additional layer of electrochemically active material onto the dried first layer wherein the additional layer comprises binder, dispersant, solvent, plasticizer and composite solids;
    drying the additional layer;
    measuring the defined thickness of the layers to compare with the required thickness; and
    repeating the providing and drying steps until the defined thickness and the required thickness are about equal.

18. The method of claim 1, the method further comprising:
    measuring the defined thickness of the dried electrolyte material to compare with a required thickness;
    providing an additional material onto the dried electrolyte material wherein the additional material comprises binder, dispersant, solvent, plasticizer and composite solids;
    drying the additional material;
    measuring the defined thickness of the materials to compare with the required thickness; and
    repeating the providing and dying steps until the defined thickness and the required thickness are about equal.

19. The method of claim 1, the method further comprising:
    measuring the defined thickness of the dried second layer to compare with a required thickness;
    providing an additional layer of electrochemically active material onto the dried second layer wherein the additional layer comprises binder, dispersant, solvent, plasticizer and composite solids;
    drying the additional layer;
    measuring the defined thickness to compare with the required thickness; and
    repeating the providing and dying steps until the defined thickness and the required thickness are about equal.

20. The method of claim 1, further comprising:
    disposing an interconnect onto a surface of the multilayer electrochemical structure; and
    repeating the steps of forming a multilayer structure to form one or more additional multilayer structures, wherein the interconnect substantially separates the multilayer structures.

21. The method of claim 1, wherein:
    the step of forming the electrolyte layer comprises forming an electrolyte layer having a thickness before firing in the range of about 5 to 1000 μm; and the step of forming the second electrode layer comprises forming a ceramic composite material layer having a thickness before firing in the range of about 50 to 150 µm.

22. The method of claim 1, wherein the step of forming at least one of the layers comprises depositing two or more sublayers of composite material to provide a defined thickness.

23. The method of claim 1, wherein energy for heating is provided by a microwave source.

24. The method of claim 1, wherein the second electrode layer is formed by screen printing on the surface of the electrolyte layer.

25. The method of claim 1, wherein:
the step of heating in a first portion of the single thermal cycle is provided at a temperature range of about 125 150° C.;
the step of heating in a second portion of the single thermal cycle is provided in a temperature range of about 275 375° C.;
the step of heating in a third portion of the single thermal cycle is provided in a temperature range of about 500 600° C.; and
the step of firing in a fourth portion of the single thermal cycle is provided at a temperature range of about 1000 1500° C.

26. The method of claim 1, wherein:
the step of forming a first electrode layer includes forming a first porous electrode layer; and
the step of forming an electrolyte layer includes forming a dense electrolyte layer, the first porous electrode layer and dense electrolyte layer comprising a bi-layer.

27. The method of claim 1, further comprising:
disposing an interconnect layer onto the surface of the second electrode layer; and
repeating the three forming steps to form another multilayer structure.

28. The method of claim 1, further comprising:
repeating the three forming steps to provide an intended number of cells, each having a first electrode layer, an electrolyte layer and a second electrode layer;
disposing an interconnect between each threelayer cell; and
disposing an interconnect on the outer surface of the first electrode layer of one cell and the outer surface of the second electrode layer of another cell.

29. The method of claim 1, further comprising:
after the step of forming a first electrode layer, the step of removing the first electrode layer from a surface on which the first electrode layer is formed.

30. The method of claim 29, further comprising trimming the first electrode layer to a desired size.

31. The method of claim 1, further comprising:
disposing an interconnect layer onto the surface of the second electrode layer, and repeating the three forming steps to form another multilayer structure, wherein the interconnect layer includes passages for guiding flow of fuel or oxidant there through to adjacent electrode layers.

32. A method for manufacturing a solid oxide fuel cell, the method comprising the following steps in the following order:
providing a first electrode layer of electrochemically active material on a substrate, the first electrode layer having a surface opposite the substrate;
removing the first electrode layer from the substrate;
depositing a layer of electrolyte material by screen printing a powder slurry including solid electrolyte particles on the surface of the first electrode layer;
depositing a second electrode layer of electrochemically active material by screen printing on a surface of the electrolyte material, wherein the electrolyte material is disposed between the electrode layers to comprise a multilayer electrochemical structure; and
thermally processing the multilayer structure in a single thermal cycle that includes:
heating the multilayer structure in a first portion of the single thermal cycle to substantially remove moisture;
heating the multilayer structure in a second portion of the single thermal cycle to substantially remove binder;
heating the multilayer structure in a third portion of the single thermal cycle to substantially remove carbon residue;
firing the multilayer structure in a fourth portion of the single thermal cycle to substantially sinter each layer and to form a solid electrolyte layer;
repeating the three forming steps to provide an intended number of cells, each having a first electrode layer, an electrolyte layer and a second electrode layer;
disposing an interconnect layer between a surface of the second electrode layer and a surface of the first electrode layer of adjacent cells; and
disposing an interconnect layer on the outer surface of the first electrode layer of one cell and an interconnect layer on the outer surface of the second electrode layer of another cell.

33. The method of claim 32, wherein the first electrode layer is formed by tape casting.

* * * * *